United States Patent [19]

Colombat

[11] Patent Number: 4,954,977
[45] Date of Patent: Sep. 4, 1990

[54] PEDAGOGIC CALCULATING MACHINE FOR ARITHMETIC INSTRUCTION

[75] Inventor: Hubert Colombat, Villeneuve-Loubet, France

[73] Assignee: Texas Instruments Incorporated, Dallas, Tex.

[21] Appl. No.: 231,733

[22] Filed: Aug. 12, 1988

[30] Foreign Application Priority Data

Sep. 13, 1987 [FR] France ................................ 87 11552

[51] Int. Cl.$^5$ ............................................. G06F 15/20
[52] U.S. Cl. ............................ 364/710.03; 364/709.07
[58] Field of Search ............ 364/710.03, 710.1, 710.11, 364/710.14, 709.07, 419

[56] References Cited

U.S. PATENT DOCUMENTS

| | | | |
|---|---|---|---|
| 3,787,988 | 1/1974 | Nakajima et al. | 364/710.03 |
| 4,225,932 | 9/1980 | Hirano | 364/710.03 |
| 4,346,450 | 8/1982 | Matsuyama | 364/710.14 |
| 4,481,598 | 11/1984 | Ishiwata | 364/710.14 |
| 4,488,250 | 12/1984 | Lipsey | 364/709.07 |
| 4,545,022 | 10/1985 | Hughins | 364/709.07 |
| 4,580,235 | 4/1986 | Yanagawa | 364/710.05 |

FOREIGN PATENT DOCUMENTS 2130782  6/1984  United Kingdom ........... 364/710.03

*Primary Examiner*—David H. Malzahn
*Attorney, Agent, or Firm*—William E. Hiller; N. Rhys Merrett; Mel Sharp

[57] ABSTRACT

Calculating machine comprising a microprocessor (1) controlling the operations carried out by the machine, a stack (2) of shift registers connected to the microprocessor and intended for the temporary storage of the numbers with which the operations are to be carried out, a read only memory (ROM) (7) containing the programs relating to the functions of the machine, a display controller (5) connected to the microprocessor (1) and to the ROM (7) and a screen (10) for displaying results, characterized in that it furthermore has means for displaying on the display screen (10) of the machine educational information relating to the mathematical rules governing the operation carried out by the machine.

7 Claims, 4 Drawing Sheets

PEDAGOGIC CALCULATING MACHINE FOR ARITHMETIC INSTRUCTION

The present invention relates to calculators and concerns, more particularly, calculators intended to be used by children of school age attending primary schools.

This calculator is thus intended for pupils of between 8 and 14 years old.

Children at primary schools are often taught mathematics in such a way that the child is required to learn by heart a certain number of basic concepts without understanding their mechanisms.

Calculating machines, which are used more and more widely in classes for small children, provide a display resulting from the operations which they carry out without giving the pupil information relating to the way in which an operation is carried out and to the method used to carry it out.

For example, in the case of division, the machine displays on its screen the quotient of the division without the pupil receiving any explanation of the manner in which this quotient is obtained.

The invention intends to overcome the disadvantages of calculating machines of the prior art by creating a calculating machine intended for pupils of primary school classes which is capable of supplementing, by means of the information which it displays, the teaching provided to the pupil.

It thus relates to a calculating machine comprising a microprocessor controlling the operations carried out by the machine, a stack of shift registers connected to the microprocessor and intended for the temporary storage of the numbers with which the operations are to be carried out, a read only memory containing the programs relating to the functions of the machine, a display controller connected to the microprocessor and to the ROM and a screen for displaying results, characterized in that it furthermore has means for displaying on the display screen of the machine educational information relating to the mathematical rules governing the operation carried out by the machine.

The invention will be better understood with the aid of the description which follows, and which is given only by way of example and with reference to the attached drawings, in which.

Figure 1:
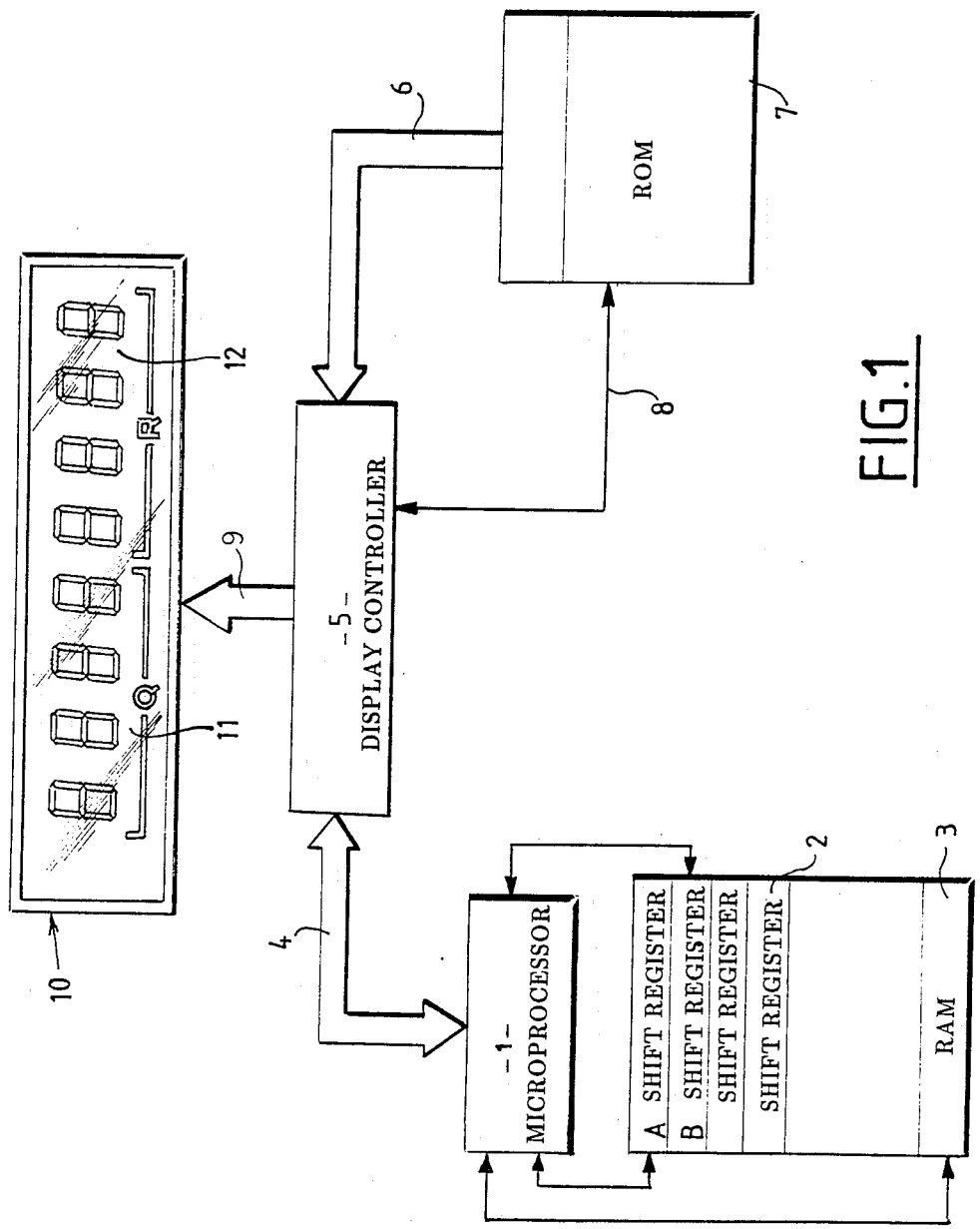
FIG. 1 is a summarizing diagram of the calculating machine according to the invention and of the means of displaying complex results when the machine is used to carry out a Euclidian division.

The calculating machine of which the summarizing diagram is shown in FIG. 1 has a microprocessor 1 connected to a stack 2 of shift registers which are intended to temporarily store the numbers with which an operation is to be carried out and also to a random access memory 3 intended to store the data relating to an ongoing operation.

The microprocessor 1 communicates by means of a bus 4 with a display controller 5 which is in turn connected by means of a data and address bus 6 to a ROM 7 containing the programming data of the various functions which the machine can perform.

The display controller 5 is furthermore connected to the read only memory 7 by means of a control lead 8.

Finally, the display controller 5 is connected by means of a bus 9 to a screen 10 for displaying results, the arrangement of which depends on the type of operation carried out by the machine.

In the present example, the calculating machine according to the invention is used to carry out a Euclidian division.

The display screen is divided into two independent zones 11 and 12, of which one 11 is intended for the display of the quotient integer of the division and the other 12 is intended for the display of the remainder of this division.

The display screen 10 is a screen having eight digits, each composed of seven segments.

The four digits of zone 11 are used for the display of the quotient integer, while the four digits, of zone 12 are used for the display of the remainder of the Euclidian division.

The two zones 11 and 12 mentioned above are indicated respectively by the letters Q and R, the display of which requires the use of a single additional display segment.

Consequently, the display of the result of a Euclidian division requires the use of only $8 \times 7 = 56 + 1 = 57$ segments.

Figure 4:
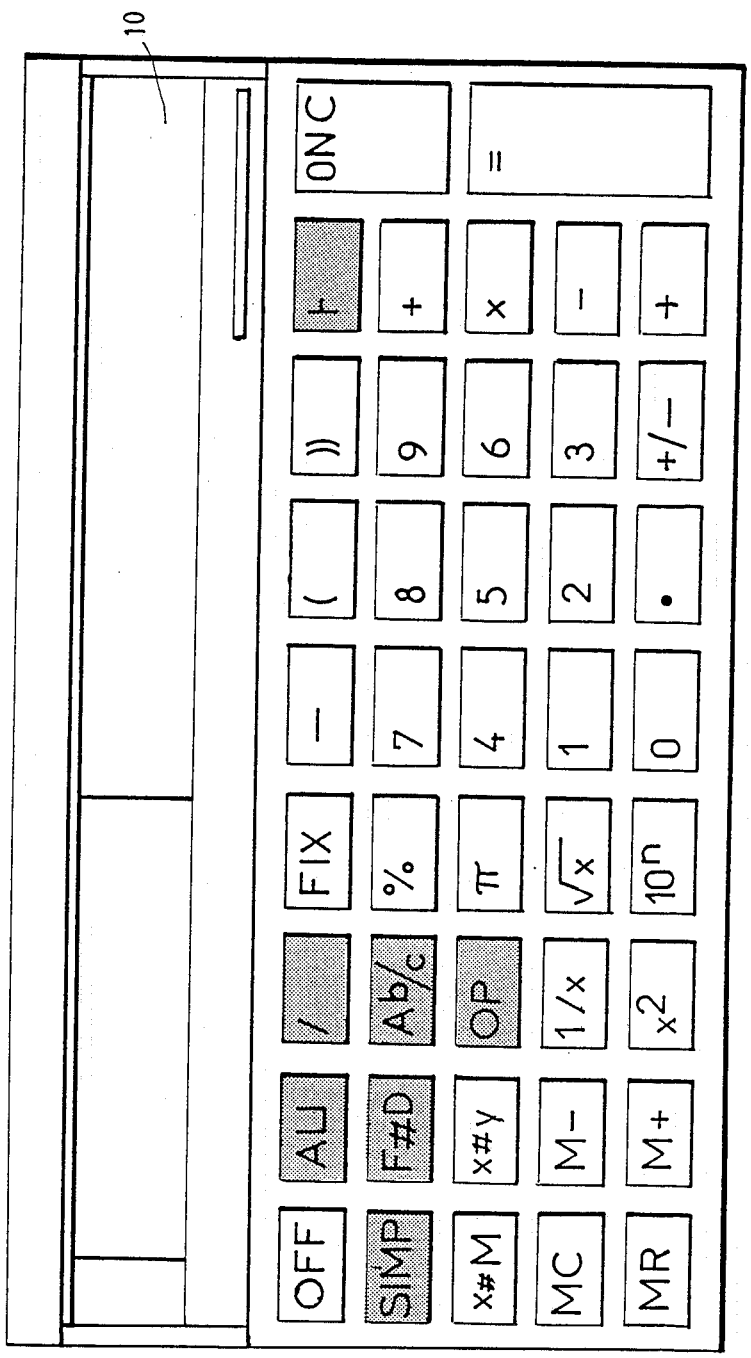
FIG. 4 is a diagram of the key panel of the machine according to the invention, comprising keys specific to the particular operations which it is intended to carry out.

Moreover, the calculating machine has a key panel, shown in FIG. 4, which in addition to the conventional keys $+$, $-$, $\times$, $\div$, has a key ⊢ which corresponds to Euclidian division, and the program for implementing this is stored in the read only memory 7.

The operation of the machine for carrying out a Euclidien division will be described by means of an example.

Let us assume that the number 14 is to be divided by the number 5.

Using the key panel of the machine, the following operations are carried out.

(1) Enter the dividend D, 14, which is stored in the register 2 and displayed on the screen 10 by the microprocessor 1.

(2) Depress button ⊢ to call the function "Euclidian division" in the ROM 7.

The dividend 14 remains displayed on the screen 10, which still looks like a conventional screen.

(3) Enter the divisor d, 5, which replaces the dividend D on screen 10.

(4) Depress the equals key =. Because of the "Euclidian division" program stored in the ROM 7 and the display controller 5, step 4 causes the appearance on the screen 10 of the zones 11 and 12, displaying the quotient and the remainder of the Euclidian division carried out, the said zones being represented for the letters Q and R.

In the zones 11 and 12 there appear respectively the quotient 2 and the remainder 4 of the Euclidian division of 14 by 5.

The simultaneous display of these two numbers enables the equation for the Euclidien division, $D = Qd + R$ or $R = D - Qd$, to be followed.

When the key = is pressed, the microprocessor 1 calculates the quotient integer Q and the remainder D—Qd, allocates the two values in two different registers A and B in the stack 2 and at the same time displays these two numbers in the corresponding zones 11 and 12 of the screen 10 in the way indicated above.

The pupil thus sees two important data displayed on the screen of the machine, these data being intended to allow him to better understand the mechanism of division.

Figure 2:
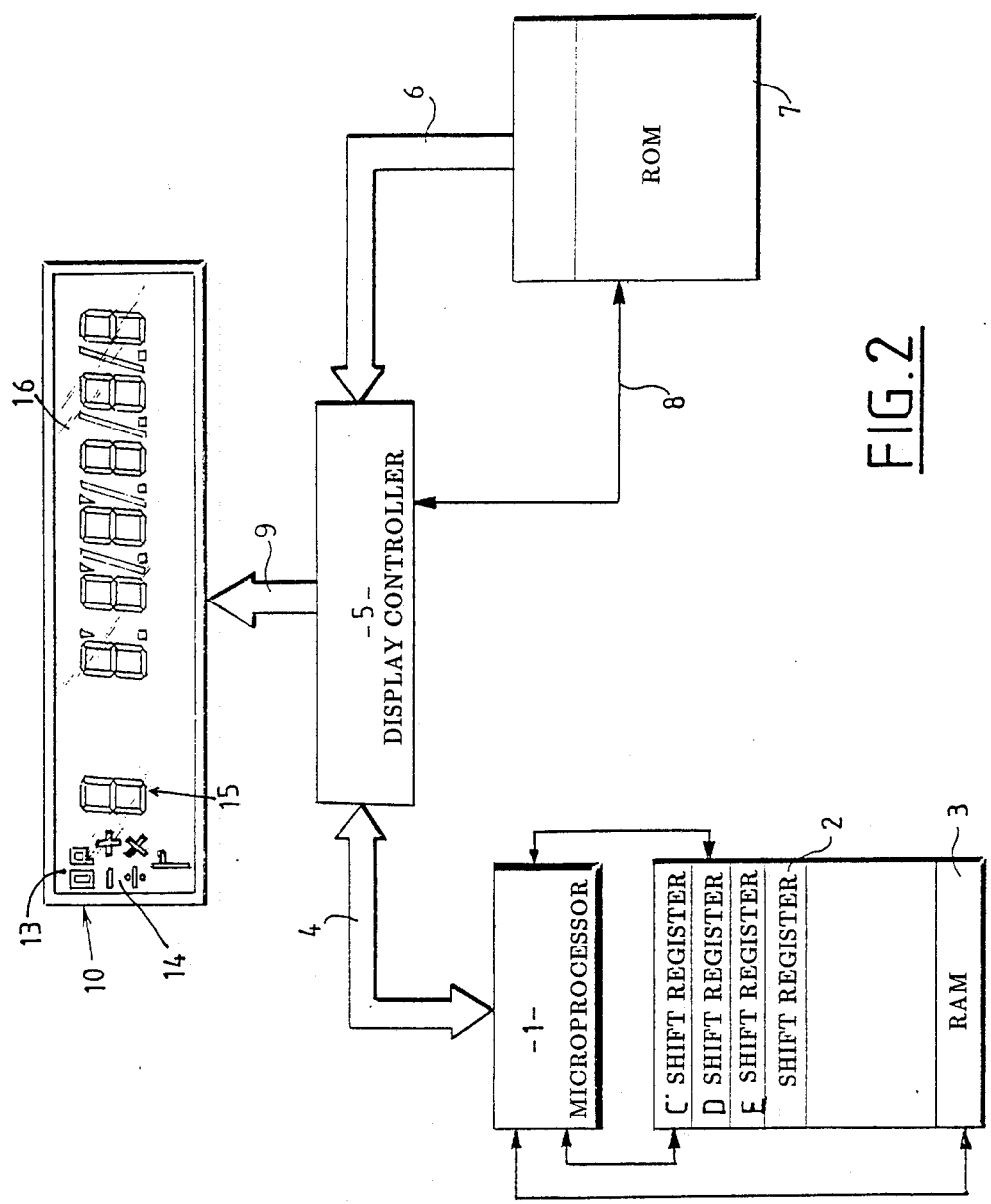
FIG. 2 is a summarizing diagram similar to that of FIG. 1, showing the display means of the machine when it is used to carry out a so-called constant operator operation.

The summarizing diagram of FIG. 2 is similar to that of FIG. 1.

It differs from the latter only in that, in the stack of shift registers 2, three registers are used. These are:

a first register C for storing the constant operator.

a second register D for keeping a count of the number of successive times the constant operator is applied to an initially displayed number.

a third register E for storing the result of the operation carried out with the constant operator.

Furthermore, the arrangement of the display screen 10 is adapted to the nature of the operation.

In fact, the screen 10 has, from left to right:

a zone 13 for displaying the symbol "OP", indicating that the operation carried out by the machine is of the constant operator type.

a zone 14 for displaying the type of operation (—, +, ÷, ×, ⊢,) connected to the constant operator.

a zone 15 having one or two digits, constituting a counter displaying the number of successive operations (+, —, ×, ÷, ⊢) carried out with the constant operator.

a zone 16 for displaying the result, either in decimals or fractions, obtained after having applied the stored constant operator to a displayed number.

The counter zone 15 and the zone 16 for displaying the result are separated by a space (FIG. 4).

The key panel of the calculator also has a key OP for the constant operator which selects in the ROM 7 the constant operator function program.

The functioning of the machine in constant operator mode is as follows.

From the keys +, —, ×, ÷, ⊢, select the type of operation which is to be carried out with a constant operator.

Then depress the selected key.

Thereafter, key in the number k intended to be the constant operator and actuate the key OP.

The microprocessor 1 interprets the data selected from the data +k, —k, ×k, ÷k, ⊢k as being an operator which will be designated below by k'.

It stores this operator in the register C of the stack 2 of shift registers and selects in the ROM 7 the constant operator function.

It then displays the indicator OP in the zone 13 of the screen 10 and the symbol +, —, ×, ÷ or ⊢ in the zone 14, corresponding to the type of operation selected.

Subsequently, when the key OP is pressed or the sequence k'OP is entered, the microprocessor 1 initializes in the stack 2 of registers the register D for counting the number of applications of the operator, and this number appears at the same time in the zone 15 of the display screen 10, the microprocessor calculates the result OPk', allocates it to the register E of the stack 2 of registers and at the same time, by means of the display controller 5, displays this result in the zone 16 of the screen 10.

Following this, the counter D is incremented by 1 each time the key OP is pressed.

Below is an example of operation of the machine with a constant operator.

Let us assume that the operator chosen is —5. This operator is to be entered and applied three times to the number 19.

The entries are made as follows.

(a) the sign "—" is entered by pressing the corresponding key of the key panel (FIG. 4).

(b) the constant 5 relating to the operator is entered by keying this number using the key panel.

(c) the key OP is pressed to store the operator "OP—", or —5.

There appears in the zones 13 and 14 of the screen the indication OP—, while the number 5 appears in the zone 16.

Carrying out the application to the constant operator implements the following phases:

(a) the number 19 is entered, to which the constant operator is to be applied. This number appears in the zone 16 of the screen 10.

(b) a first application of the key OP is carried out by pressing the key OP.

The operation 19—5 is carried out by the microprocessor 1, and the result of this operation, i.e. 14, appears in the zone 16 of the screen 10, while the number 1 appears in the zone 15, indicating that the operation —5 has been applied once.

When the key OP is pressed again, the constant operator —5 is applied to the result of the preceding operation, which gives the operation 14—5, i.e. 9.

There now appear in the zones 16 and 15 of the screen 10 respectively the result 9 and the indication 2 corresponding to the number of applications of the constant operator —5.

When the key OP is pressed a third time, there is obtained in the same way the display, in the zones 15 and 16 of the screen 10, of the result of the operation 9—5, i.e. 4, and the number 3 of applications of the constant operator.

It can be seen that the particular arrangement of the machine according to the invention enables the operator to be stored by entering in the machine first the operation and then the constant.

Regarding the example which has just been described, by first pressing the key and then keying in the constant to be subtracted in order to store the operation, the user is conscious that he is going to ask the machine to carry out a subtraction operation, which, from the educational point of view, constitutes a considerable advantage by comparison with existing calculating machines, in which the number to be subtracted is first entered, followed by the sign.

To apply the operator to a displayed number x, press the key OP, which corresponds to keying in the application f(x), while in conventional machines the key = is pressed.

The machine according to the invention is again advantageous from the educational point of view here.

The existence of a counter displayed in zone 15 of the display screen enables the number of operations carried out in constant operator mode to be followed, which in many cases facilitates calculations.

Of the applications of the machine according to the invention including Euclidian division and constant operator functions, there may be mentioned the conversion of a decimal number into its equivalent number in any base.

Let us assume that the starting decimal number is D and the base of the number to be obtained is d.

Euclidian division of D by d gives the following successive equations.

| 1st time | $D = dQ_1 + R_1$ |
|---|---|
| 2nd time | $= d(dQ_2 + R_2) + R_1$ |
| 3rd time | $= d((dQ_3 + R_3) + R_2) + R_1$ |
| . | . |
| . | . |
| . | . |
| $n - 1$st time | $= d\,^{n-1}Q_{n-1} + d\,^{n-2}R_{n-1} + \ldots dR_2 + R_1$ |
| nth ($Q_n = 0$) | $= d\,^{n-1}R_n + d\,^{n-2}R_{n-1} + \ldots dR_2 + R_1$ |

By way of example, there will be given the conversion using the machine according to the invention of the decimal number 5969 into its equivalent in the base 8.

In this case, $D = 5969$ and $d = 8$.

The constant operator OP ⊢ 8 is therefore used.

The calculation is carried out in the following way.

| Entry | Keys | | Display | | Comments |
|---|---|---|---|---|---|
| 8 | | | 8 | | |
| | ⊢ | | 8 | | Euclidean division |
| | OP | OP⊢ | 8 | | by 8, constant operator mode |
| 5969 | OP | OP⊢ | 746 -Q- | 1 -R- | note $R_1 = 1$ |
| | OP | OP⊢ | 93 -Q- | 2 -R- | note $R_2 = 2$ |
| | OP | OP⊢ | 11 -Q- | 5 -R- | note $R_3 = 5$ |
| | OP | OP⊢ | 1 -Q- | 3 -R- | note $R_4 = 3$ |
| | OP | OP⊢ | 0 -Q- | 1 -R- | note $R_5 = 1$ |

The calculation is terminated here, since the last quotient Q5 is zero.

By referring to the calculation above, one can see that the remainders of the successive Euclidian divisions constitute the digits of the equivalent number in base 8 to the decimal number 5969, i.e. 12531.

Figure 3:
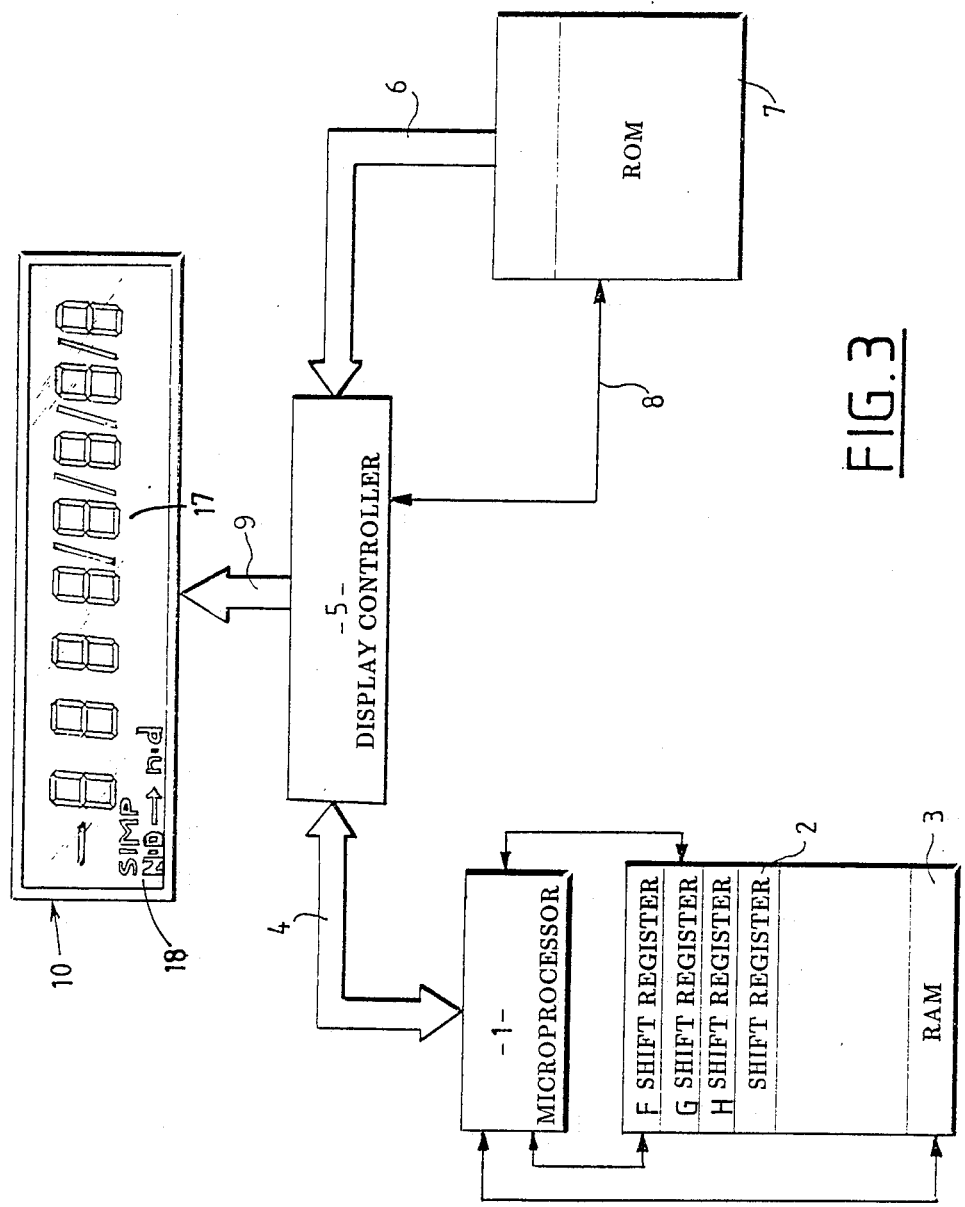
FIG. 3 is a summarizing diagram similar to the preceding diagrams, showing the display means of the machine according to the invention when it is used to carry out fraction calculations.

FIG. 3 shows a summarizing diagram of the machine according to the invention when applied to fraction operations.

Here too, the diagram of the machine means used to carry out the fraction operations is similar to that of FIGS. 1 and 2.

In order to implement this function, the stack 2 of shift registers has a register F for the divisor, a register G for the integer part and a register G for the fractional part.

In the ROM 7 there are recorded:

a program for searching for the integer part and fractional part.

a program for searching for the lowest common denominator.

a program to test for reduction (N/D—>n/d) and for divisor.

The display screen 10 of the machine has a zone 17 for displaying the result in the integer or fractional form and a zone 18 for indicating the reduction process "SIMP" and for displaying an indicator showing that the displayed fraction can be reduced N/D—>n/d.

The implementation of the indicator N/D—>n/d mentioned above is carried out in the following manner.

When the result of an operation carried out by the machine appears in the zone 17 of the screen 10 in its "fractional" form, the microprocessor 1 calls from the ROM 7 the test program which determines whether the displayed fraction can be reduced.

This program consists in finding out whether the numerator N and denominator D of the fraction displayed have an integer common divisor other than 1.

This divisor is then placed in the register F of the stack 2 of registers.

If the fraction can be reduced, there appears in the zone 18 of the screen 10 the indicator N/D—>n/d at the same time as the result appears in the zone 17.

Let us assume, by way of example, that the operation to be carried out is as follows:

$$\frac{2}{4} + \frac{1}{3} = \frac{10}{12}$$

To carry out this operation, the procedure is as follows:

| Key | Display |
|---|---|
| 2 | 2 |
| / | 2/ |
| 4 | 2/4 |
| + | 2/4 |
| 1 | 1 |
| / | 1/ |
| 3 | 1/3 |
| = | N/D — > n/d  10/12 |

It can be seen that, as soon as the result of the operation, i.e. 10/12, appears on the screen, the indicator N/D—>n/d appears simultaneously, showing that the fraction obtained can be reduced and that the test program has found a common divisor for the numerator N and the denominator D of the fraction, namely the number 2 in the present example.

While conventional calculators which are capable of carrying out fraction operations give the result directly in the most reduced form, the machine according to the invention gives indications as to the process of reducing fractions, which is a major advantage from the educational point of view.

The reducing operation can be carried out in two ways:

(a) Automatic process

The key SIMP on the machine is used, and the sequence SIMP, = is entered.

The calculator divides the numerator N and the denominator D of the fraction displayed by the lowest common divisor displayed in the register F, which gives the result 5/6 for the fraction 10/12.

(b) Indirect process

The user suggests a common divisor for the numerator N and the denominator D of the displayed fraction.

He thus enters in the machine the sequence SIMP, k, =

The calculator tests whether the numerator and the denominator of the fraction are divisible by k.

Taking the example above, let us assume that the user attempts to apply the divisor 5 to the fraction 10/12.

He keys in the sequence:

SIMP, 5, =

The machine confirms that 5 is not a common divisor for 10 and 12, and the result 10/12 remains unchanged, but still accompanied by the indicator N/D—>n/d, showing that the fraction can be reduced.

The user then tries the number 2, by the same process.

Following this, the fraction 5/6 appears in the zone 17 of the display screen, and the indicator N/D—>n/d disappears from the zone 18, thus showing that the fraction obtained cannot be reduced.

In the case of a fraction which can be reduced several times, such as 8/12, in automatic operation the machine always searches for the lowest common divisor of the numerator and the denominator.

Consequently, starting from the display N/D—>n/d 8/12 on the screen 10, when the sequence SIMP, =is entered, there is first of all obtained N/D—>n/d 4/6.

It is therefore necessary to enter the sequence SIMP, =a second time to obtain the fraction 2/3, which cannot be reduced, and to see N/D—>n/d disappear from the zone 18 of the screen.

The calculator according to the invention also has the feature of containing, preprogrammed, the rules of calculation giving the nonreduced results of operations on fractions.

In the case of addition and subtraction, the result has a denominator which is the lowest common denominator of the fractions.

For multiplication and division, the results appear respectively in the following form.

$$\frac{N1}{D1} \times \frac{N2}{D2} = \frac{N1N2}{D1D2}$$

$$\frac{N1}{D1} \approx \frac{N2}{D2} = \frac{N1D2}{D1N2}$$

This then enables the user to proceed, if it is indicated as necessary by the simultaneous appearance of the indicator N/D—>n/d, to the reduction of the result in the manner indicated above.

In the case of addition and subtraction, the program for searching for the lowest common denominator of the two terms of the operation which are contained in the ROM 7 will be used to display the result.

For example, in the case of the operation:

$$\frac{2}{4} + \frac{1}{6},$$

the lowest common denominator, 12, is calculated by the machine, and the result displayed is then N/D—>n/d 8/12, showing that the fraction can be reduced.

It can be seen that the machine according to the invention enables the calculation process to be followed on the display screen in a manner similar to the process which must be used by the pupil when he has to carry out the operation manually.

Thus, while facilitating the task of the user, the machine according to the invention enables him to be familiarized with the rules of mathematics which he is also taught.

I claim:

1. An electronic data processing apparatus for providing educational instruction in arithmetical operations, said electronic data processing apparatus comprising:

first memory means for receiving data representative of respective numerals on which selected arithmetic operations involving the numerals are to be carried out;

processor means operably connected to said first memory means for controlling the arithmetic operations carried out with respect to data representative of respective numerals stored in said first memory means;

data input means operably connected to said first memory means and to said processor means for entering data into said first memory means to include respective numerals and to select an arithmetic operation involving the entered numerals to be carried out by said processor means;

display means providing a display screen subject to variable background visual representations respectively corresponding to one of a plurality of mathematical procedure modes;

said display screen in a first one of said plurality of mathematical procedure modes having at least first and second independent zones thereon, said first zone being adapted to display the quotient integer of an arithmetic Euclidean division problem, and said second zone being adapted to display the remainder number of the arithmetic Euclidean division problem;

display controller means operably interposed between said display means and said processor means and respectively connected thereto for regulating the operation of said display means in providing a visual representation on said display screen;

second memory means containing program instructions and being operably connected to said display controller means;

said data input means including a plurality of mathematical procedure mode keys for selective actuation to designate to said processor means the selected arithmetic operation to be carried out by said apparatus;

said display controller means having a plurality of alternative display sequence means for respectively imparting to said display screen variable mathematical procedure background graphics in response to program instructions from said second memory means and to command signals from said processor means dependent upon the data entered by said data input means; and said display controller means having at least a first alternative display sequence means for imparting to said display screen said at least first and second independent zones thereon in a mathematical procedure mode corresponding to the display of an arithmetic Euclidean division problem.

2. An electronic data processing apparatus as set forth in claim 1, wherein said first alternative display sequence means of said display controller means affects a visual graphics display on said display screen identifying said at least first and second independent zones thereon by respective symbols indicative of the quotient integer of an arithmetic Euclidean division problem for the first zone and of the remainder number of the arithmetic Euclidean division problem for the second zone.

3. An electronic data processing apparatus as set forth in claim 2, wherein said plurality of mathematical procedure mode keys of said data input means includes a special Euclidean division key;

said second memory means comprising a read-only-memory having at least a program stored therein for carrying out an operation of a Euclidean division, said Euclidean division program being accessed from said read-only-memory in response to the selective actuation of said Euclidean division key via said processor means;

said first memory means comprising a plurality of shift registers arranged in a stack and including one shift register for containing the quotient Q and another shift register for containing the remainder R of the Euclidean division; and said display controller means being responsive to said Euclidean division program as accessed from said read-only-memory for providing said first alternative display sequence means to impart to said display screen the visual graphics display in which said first zone is identified by the symbol indicative of the quotient integer and said second zone is identified by the symbol indicative of the remainder number of the Euclidean division.

4. An electronic data processing apparatus as set forth in claim 1, wherein said display screen in a second one of said plurality of mathematical procedure modes has an arrangement of a plurality of independent zones different from the first and second independent zones of said first mathematical procedure graphics and including:

a title zone for displaying indicia indicative of a constant operator mathematical procedure mode, an arithmetic operation zone for displaying indicia identifying the arithmetic operation to be carried out, a counter zone for displaying the number of successive arithmetic operations carried out with the constant operator, and a computations zone for displaying the numerical result obtained after applying the constant operator to a displayed number;

said display controller means having a second alternative display sequence means for imparting to said display screen said title zone, said arithmeatic operation zone, said counter zone, and said computations zone in a mathematical procedure mode employing a constant operator; and said data input means having a constant operator mode key as one of said plurality of mathematical procedure mode keys for designating a mathematical procedure mode employing a constant operator to said processor means upon actuation thereof.

5. An electronic data processing apparatus as set forth in claim 4, wherein said second memory means comprises a read-only-memory having a program for executing operations in a constant operator mode stored therein;

said program for executing operations in a constant operator mode being accessed from said read-only-memory in response to the selective actuation of said constant operator mode key via said processor means; and said first memory means comprising a plurality of shift registers arranged in a stack and including respective shift registers for containing the constant operator to be employed in the execution of the constant operator mode operation, the count of the number of times that the constant operator has been applied, and the numerical result of the operation in the constant operator mode.

6. An electronic data processing appratus as set forth in claim 4, wherein said display screen in a third one of said plurality of mathematical procedure modes has an arrangement of a plurality of independent zones different from the respective zones of said first and second mathematical procedure graphics and including:

a title zone for displaying indicia indicative of a number fractions mathematical procedure mode and indicia demonstrating the reduction of a displayed fractional number, a computations zone for displaying the numerical result of a mathematical division problem having a numerator and a denominator in an integer or fractional number form;

said display controller means having a third alternative display sequence means for imparting to said display screen, said title zone, and said computations zone of said third mathematical procedure mode involving number fractions; and said data input means having a number fractions mode key as one of said plurality of mathematical procedure mode keys for designating a mathematical procedure mode involving number fractions to said processor means upon actuation thereof.

7. An electronic data processing apparatus as set forth in claim 6, wherein said second memory means comprises a read-only-memory having a program for searching for the integer part and the fractional part of the results of a mathematical division problem as carried out and a program for searching for the lowest common denominator of the fractions on which the third mathematical procedure mode involving number fractions is carried out;

said data input means having a fraction simplification key as one of said plurality of mathematical procedure mode keys for controlling the reduction of a fractional result of the third mathematical procedure mode;

a program for testing for the reduction of a fractional number result and for application of the lowest common divisor of the non-reduced fractional number result as shown on said display screen being accessed from said read-only-memory in response to the selective actuation of said fraction simplification key via said processor means; and said first memory means comprising a plurality of shift registers arranged in a stack and including respective shift registers for containing the divisor number intended for the reduction of the fractional result of the third mathematical procedure mode operation, the integer portion, and the fractional portion of the said result.

* * * * *